United States Patent
Shizuno

(10) Patent No.: US 8,489,766 B2
(45) Date of Patent: Jul. 16, 2013

(54) INFORMATION PROCESSING APPARATUS, CONTROL METHOD THEREFOR, AND COMPUTER-READABLE STORAGE MEDIUM, FOR UPDATING DEVICE INFORMATION CORRESPONDING TO A DEVICE AMONG THE DEVICE INFORMATION STORED IN A STORAGE UNIT, AND FOR SENDING A NOTIFICATION FOR RELEASING AN INTERNET-PROTOCOL ADDRESS ASSIGNED TO THE DEVICE TO A DYNAMIC-HOST-CONFIGURATION-PROTOCOL SERVER BASED ON WHETHER RECEIVED INFORMATION SPECIFIES A SPECIFIC CONDITION

(75) Inventor: Kaori Shizuno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 12/477,053

(22) Filed: Jun. 2, 2009

(65) Prior Publication Data

US 2009/0300176 A1 Dec. 3, 2009

(30) Foreign Application Priority Data

Jun. 3, 2008 (JP) ................. 2008-145716

(51) Int. Cl.
*G06F 15/16* (2006.01)
(52) U.S. Cl.
USPC ......................... 709/245; 709/227
(58) Field of Classification Search
USPC ......................... 709/220–229, 245
See application file for complete search history.

(56) References Cited

U.S. PATENT DOCUMENTS

| 7,577,725 | B1* | 8/2009 | Sitaraman et al. | 709/221 |
| 7,792,942 | B1* | 9/2010 | Regan et al. | 709/223 |
| 7,839,857 | B2* | 11/2010 | Tsuge et al. | 370/392 |
| 2003/0200311 | A1* | 10/2003 | Baum | 709/224 |
| 2005/0114492 | A1* | 5/2005 | Arberg et al. | 709/223 |
| 2007/0195804 | A1* | 8/2007 | Ijima et al. | 370/401 |
| 2009/0210518 | A1* | 8/2009 | Verma et al. | 709/220 |
| 2010/0191839 | A1* | 7/2010 | Gandhewar et al. | 709/220 |

FOREIGN PATENT DOCUMENTS

| JP | 2004-062443 A | 2/2004 |
| JP | 2006-121214 A | 5/2006 |
| JP | 2007-097057 A | 4/2007 |
| JP | 2007-128260 A | 5/2007 |
| WO | WO 2007043353 A1 * | 4/2007 |

* cited by examiner

*Primary Examiner* — Patrice Winder
*Assistant Examiner* — Julian Chang
(74) *Attorney, Agent, or Firm* — Canon USA, Inc., IP Division

(57) ABSTRACT

An information processing apparatus connected via a network to a plurality of devices and a DHCP server adapted to assign an IP address to each of the devices includes a storage unit that stores device information for each of the devices, a receiving unit that receives from a second information processing apparatus a search request for searching for a device, a search unit that searches for a device in response to the search request received by the receiving unit, a sending unit that sends a search result obtained by the search unit to the second information processing apparatus, and a control unit that updates, when a device is no longer capable of communicating via the network, device information corresponding to the device among the device information stored in the storage unit and that sends a notification for releasing the IP address assigned to the device to the DHCP server.

15 Claims, 15 Drawing Sheets

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            <EndpointReference>
            <DhcpRelease>
                <ServerID>10</ServerID>        ⎫
                <ClientID>123</ClientID>       ⎬ 1801
            </DhcpRelease>                      ⎭
        </Bye>
    </Body>
</Envelope>
```

FIG. 7

| CID | DISTRIBUTION ADDRESS | SUBNET MASK | EFFECTIVE TIME |
|---|---|---|---|
| 101 | 192.168.0.1 | 255.255.252.0 | 20 h |
| 202 | 192.168.0.2 | 255.255.252.0 | 20 h |
| 303 | 192.168.0.3 | 255.255.252.0 | 20 h |

| ID | UUID | VERSION | DEVICE TYPE | MODEL NAME | DEVICE NAME | URL | IP ADDRESS |
|---|---|---|---|---|---|---|---|
| 1 | 123456 | 1 | PRINTER | LBPXXXX | Dev Printer | http://192.168.0.1/wsd/mex | 192.168.0.1 |
| 2 | 987654 | 1 | PRINTER | LBPYYYY | Sales Printer | http://192.168.0.2/wsd/mex | 192.168.0.2 |
| 3 | abcdef | 1 | MFP | MFPXXXX | Dev MFP | http://192.168.0.3/wsd/mex | 192.168.0.3 |

```
<Envelope>
    <Header>
        <Action>Hello</Action>
        <MessageID>1</MessageID>         } 901
        <To>urn:discovery</To>
    </Header>
    <Body>
        <Hello>
            <EndpointReference>
                <Address>urn:uuid:123456</Address>
            </EndpointReference>
            <Types>MFP</Types>                              } 902
            <XAddrs>http://192.168.0.1/wsd/mex</XAddrs>
            <MetadataVersion>1</MetadataVersion>
        </Hello>
    </Body>
</Envelope>
```

FIG. 10

```
<Envelope>
    <Header>
        <Action>Get</Action>
        <MessageID>1</MessageID>
        <To>urn:uuid:123456</To>
    </Header>
    </Body>
</Envelope>
```

FIG. 11

```
<Envelope>
   <Header>
      <Action>GetResponse</Action>
      <MessageID>1</MessageID>
      <To>anonymous</To>
   </Header>
   <Body>
      <Metadata>
         <MetadataSection>
            <ThisDevice>
               <FriendlyName>Dev Printer</FriendlyName>
               <FirmwareVersion>1.00</FirmwareVersion>                    ⎫
               <SerialNumber>1111</SerialNumber>                          ⎬ 1101
            </ThisDevice>                                                 ⎭
         </MetadataSection>
         <MetadataSection>
            <ThisModel>
               <Manufacturer>Xxxxx</Manufacturer>
               <ManufacturerUrl>http://www.xxxx.com</ManufacturerUrl>     ⎫
               <PresentationUrl>http://192.168.0.1</PresentationUrl>      ⎬ 1102
               <ModelName>LBPXXXX</ModelName>                             ⎭
            </ThisModel>
         </MetadataSection>
         <MetadataSection>
            <Relationship>
               <Hosted>
                  <EndpointReference>
                     <Address>http://192.168.0.1/wsd/print</Address>      ⎫
                  </EndpointReference>                                    ⎬ 1103
                  <Types>PrinterServiceType<Types>                        ⎭
                  <ServiceId>uri:123456</ServiceId>
               </Hosted>
            </Relationship>
         </MetadataSection>
      <Metadata>
   </Body>
</Envelope>
```

FIG. 13

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            </EndpointReference>
        </Bye>
    </Body>
</Envelope>
```

FIG. 14

```
<Envelope>
    <Header>
        <Action>Probe</Action>
        <MessageID>1</MessageID>
        <To>urn:discovery</To>
    </Header>
    <Body>
        <Probe>
            <Types>Printer</Types>
        </Probe>
    </Body>
</Envelope>
```

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            <EndpointReference>
            <DhcpRelase>
                <ServerID>10</ServerID>
                <ClientID>123</ClientID>
            </DhcpRelease>
        </Bye>
    </Body>
</Envelope>
```

1801 brackets the DhcpRelase block.

INFORMATION PROCESSING APPARATUS, CONTROL METHOD THEREFOR, AND COMPUTER-READABLE STORAGE MEDIUM, FOR UPDATING DEVICE INFORMATION CORRESPONDING TO A DEVICE AMONG THE DEVICE INFORMATION STORED IN A STORAGE UNIT, AND FOR SENDING A NOTIFICATION FOR RELEASING AN INTERNET-PROTOCOL ADDRESS ASSIGNED TO THE DEVICE TO A DYNAMIC-HOST-CONFIGURATION-PROTOCOL SERVER BASED ON WHETHER RECEIVED INFORMATION SPECIFIES A SPECIFIC CONDITION

BACKGROUND OF THE INVENTION

1. Field of the Invention

The present invention relates to an information processing apparatus in a network environment based on Dynamic Host Configuration Protocol (DHCP), a control method for the information processing apparatus, and a computer-readable storage medium.

2. Description of the Related Art

Access to devices connected to networks, such as printers, from client personal computers (PCs) over the networks has been available. Several techniques for allowing a client PC to search for a device on a network have been available. In some techniques, a search server is provided on a network, and a client PC accesses the search server for query (for example, Japanese Patent Laid-Open No. 2004-62443). In such techniques, the search server has a database for providing centralized management of device information of individual devices connected to the network. Then, each time device information of a device is changed, the contents of the database are updated. For instance, when a device connected to the network is powered off or is disconnected from the network, device information of the device is deleted from the database.

Further, in recent years, in an environment where a plurality of nodes such as client PCs or devices are connected to a network, such network nodes have been often assigned Internet protocol (IP) addresses using a DHCP-based system. DHCP is a mechanism for dynamically assigning an IP address to a node connected to a network, such as a client PC or a device. In DHCP, a node assigned an IP address is referred to as a DHCP client and a server that assigns an IP address is referred to as a DHCP server. A DHCP client that wishes to be assigned an IP address issues a request to the DHCP server to obtain an IP address. The DHCP server manages the DHCP client that has issued the request and the IP address assigned to the requesting DHCP client. The DHCP client sends a notification for releasing the IP address to the DHCP server when the IP address is no longer necessary. Upon receiving the release notification, the DHCP server releases the assignment of the IP address to the DHCP client. As a result, this IP address can be assigned to another DHCP client, thus providing for effective use of a limited number of IP addresses.

In techniques of the related art, however, a DHCP client may omit the step of sending an IP address release notification to the DHCP server in order to, for example, speed up the shut down process of the client's machine.

In this case, the IP address assigned to the DHCP client by the DHCP server is still assigned to the DHCP client although it is no longer necessary (this DHCP client no longer exists). This can prevent effective use of IP addresses.

Moreover, in a case where a DHCP client is required to notify the server of a shutdown, an increased load is placed on the DHCP client when a plurality of servers such as a search server and a DHCP server exist.

SUMMARY OF THE INVENTION

The present invention provides more effective management of IP addresses in a DHCP server when a DHCP server and a search server exist in a network.

According to a first aspect of the present invention, an information processing apparatus connected via a network to a plurality of devices and a DHCP server adapted to assign an IP address to each of the plurality of devices includes a storage unit adapted to store device information for each of the plurality of devices, a receiving unit adapted to receive from a second information processing apparatus a search request for searching for a device, a search unit adapted to search for a device in response to the search request received by the receiving unit, a sending unit adapted to send a search result obtained by the search unit to the second information processing apparatus, and a control unit adapted to update, when a device is no longer capable of communicating via the network, device information corresponding to the device among the device information stored in the storage unit and to send a notification for releasing the IP address assigned to the device to the DHCP server.

According to a second aspect of the present invention, a method for controlling an information processing apparatus connected via a network to a plurality of devices and a DHCP server adapted to assign an IP address to each of the plurality of devices, comprising storing device information for each of the plurality of devices in a storage unit, receiving from a second information processing apparatus a search request for searching for a device, searching for a device in response to the received search request, sending an obtained search result to the second information processing apparatus, and when a device is no longer capable of communicating via the network, updating device information corresponding to the device among the device information stored in the storage unit and sending a notification for releasing the IP address assigned to the device to the DHCP server.

According to a third aspect of the present invention, a computer-readable storage medium stores a computer program for causing an information processing apparatus connected via a network to a plurality of devices and a DHCP server adapted to assign an IP address to each of the plurality of devices to execute storing device information for each of the plurality of devices in a storage unit, receiving from a second information processing apparatus a search request for searching for a device, searching for a device in response to the received search request, sending an obtained search result to the second information processing apparatus, and when a device is no longer capable of communicating via the network, updating device information corresponding to the device among the device information stored in the storage unit and sending a notification for releasing the IP address assigned to the device to the DHCP server.

Other features, objects and advantage of the present invention will be apparent from the following description when taken in conjunction with the accompanying drawings, in which like reference characters designate the same or similar parts throughout the figures thereof.

The accompanying drawings, which are incorporated in and constitute a part of the specification, illustrate embodi-

BRIEF DESCRIPTION OF THE DRAWINGS

FIG. 7 is a diagram showing an example of information held in a distribution information database (DB) of the DHCP server according to the present exemplary embodiment.

FIG. 8 is a diagram showing an example of device information held in a device information holding unit of the DP according to the present exemplary embodiment.

FIG. 9 is a diagram showing a Hello message according to the present exemplary embodiment.

FIG. 10 is a diagram showing an example of a Get message according to the present exemplary embodiment.

FIG. 11 is a diagram showing an example of a GetResponse message according to the present exemplary embodiment.

FIG. 13 is a diagram showing an example of a Bye message according to the present exemplary embodiment.

FIG. 14 is a diagram showing an example of a Probe message according to the present exemplary embodiment.

DESCRIPTION OF THE EMBODIMENTS

Figure 1:
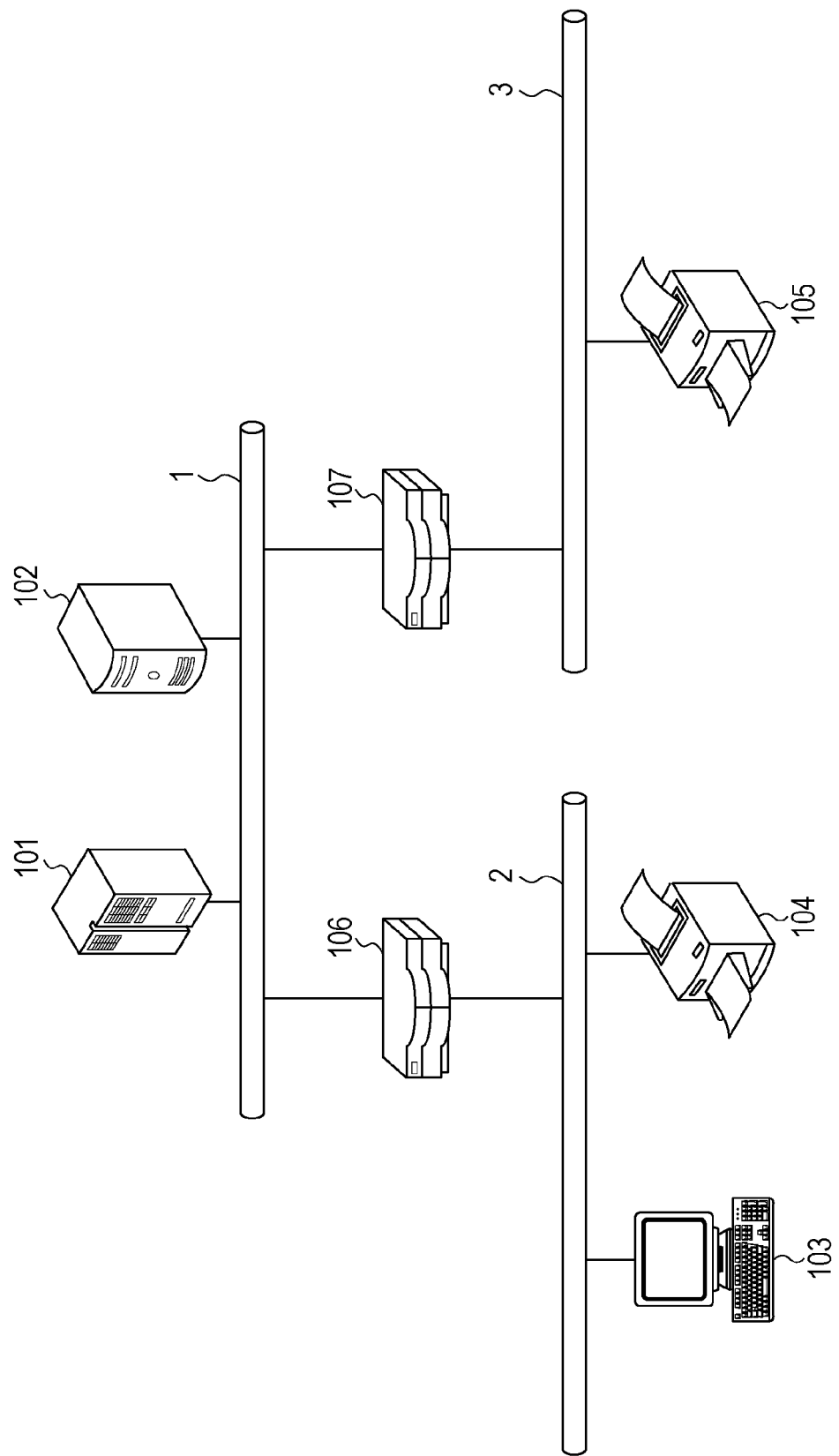
FIG. 1 is a schematic diagram of a device search system according to an exemplary embodiment of the present invention.

FIG. 1 is a diagram showing a structure of a device search system according to a first exemplary embodiment of the present invention.

A DHCP server 101 and a discovery proxy (DP) 102 serving as a search server are connected to a subnet 1. A client PC 103 and an image forming apparatus 104 are connected to a subnet 2. An image forming apparatus 105 is connected to a subnet 3. The subnets 1 and 2 are connected to each other via a router 106, and the subnets 1 and 3 are connected to each other via a router 107. The subnets 1 to 3 form one local area network (LAN). Consequently, the terminals connected to all the subnets can communicate with each other. Each of the routers 106 and 107 is configured not to allow broadcast or multicast received from one subnet to directly pass therethrough to another subnet. Thus, communication via broadcast or multicast is available only within each subnet. Here, in the present exemplary embodiment, each of the image forming apparatuses 104 and 105 is an example of a device according to the present invention, and may be a printer, a copier, a scanner, a multifunction device, a facsimile machine, or the like. Further, in the present exemplary embodiment, each of the DHCP server 101, the DP 102, and the client PC 103 is an example of an information processing apparatus according to the present invention, and may be a general-purpose PC. In the device search system shown in FIG. 1, in order to search for an image forming apparatus desired by a user who operates the client PC 103, a search request packet is sent from the client PC 103 to the DP 102. Then, after a device is found in the DP 102, a search result is sent to the client PC 103.

Next, a method for distributing setting information such as an IP address using DHCP will be described. DHCP is a protocol that defines a mechanism for distributing setting information to terminals connected to a network, the details of which are defined in Request for Comments (RFC) 2131 of the Network Working Group. DHCP adopts a client-server method. A DHCP server provides centralized management of various types of setting information, and a DHCP client, or a network terminal, receives such setting information.

Figure 2:
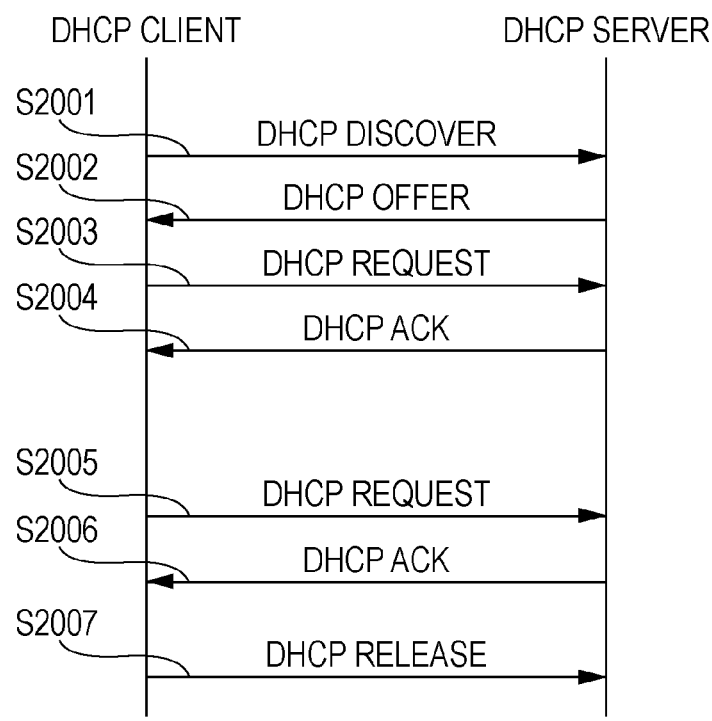
FIG. 2 is a flow diagram of the obtainment of information based on DHCP.

FIG. 2 is a sequence diagram describing a flow of DHCP messages sent and received between a DHCP server and a DHCP client. The DHCP client broadcasts a DHCP DISCOVER message (S2001). Upon receipt of the DHCP DISCOVER message, the DHCP server assigns an IP address to the DHCP client that has sent the message, and then sends a DHCP OFFER message (S2002). The DHCP OFFER message includes the IP address assigned to the DHCP client that has sent the DHCP DISCOVER message and other setting information.

Upon receipt of the DHCP OFFER message, the DHCP client broadcasts a DHCP REQUEST message for using the IP address included in the DHCP OFFER message (S2003). Upon receipt of the DHCP REQUEST message, the DHCP server sends a DHCP ACK message (S2004). Upon receipt of the DHCP ACK message, the DHCP client performs subsequent network communications using the distributed IP address and setting information.

The IP address distributed from the DHCP server has a period (lease time) during which the IP address can be used. In order to continuously use the obtained IP address after the lease time has expired, the DHCP client sends a DHCP REQUEST message to the DHCP server before the lease time has expired (S2005). Upon receipt of the DHCP REQUEST from the assigned IP address, the DHCP server updates the lease time and sends a DHCP ACK message (S2006).

When the DHCP client stops using the IP address, the DHCP client sends a DHCP RELEASE message to the DHCP server (S2007). Upon receipt of the DHCP RELEASE message, the DHCP server releases the assigned IP address so that this IP address can be assigned to another DHCP client.

Further, when the lease time has elapsed without a DHCP REQUEST coming from the assigned IP address before the lease time has expired, the DHCP server releases the assigned IP address so that this IP address can be assigned to another DHCP client.

In the flow shown in FIG. 2, in S2001 to S2004, the messages are sent via broadcast. This is because the DHCP client has not been assigned an IP address at the respective time points.

In a network in which, as in the configuration shown in FIG. 1, a plurality of subnets are connected via routers, if routers are configured to prevent broadcast from passing therethrough, the DHCP messages handled in S2001 to S2004 are blocked by the routers. In order to overcome this inconvenience, RFC 2131 provides a specification for relay agents. A relay agent is generally implemented as a function of a router, the operation of which will be briefly described using the symbols shown in FIG. 1.

First, the router 106, which implements a relay agent function, stores the IP address of the DHCP server 101 in advance. The client PC 103 serving as a DHCP client broadcasts a DHCP DISCOVER or DHCP REQUEST message to the subnet 2. Upon receipt of the DHCP DISCOVER or DHCP REQUEST message, the router 106 transfers the message via unicast to the DHCP server 101 having the message stored therein in advance. Upon receipt of the DHCP DISCOVER or DHCP REQUEST message from the router 106 via unicast, the DHCP server 101 sends a DHCP OFFER or DHCP ACK message to the router 106 via unicast. Upon receipt of the DHCP OFFER or DHCP ACK message from the DHCP server 101, the router 106 broadcasts this message to the subnet 2.

In this manner, a router implementing a relay agent function receives a DHCP message sent via broadcast and transfers the DHCP message to a DHCP server via unicast. Thus, a DHCP client can receive information from the DHCP server.

Figure 3:
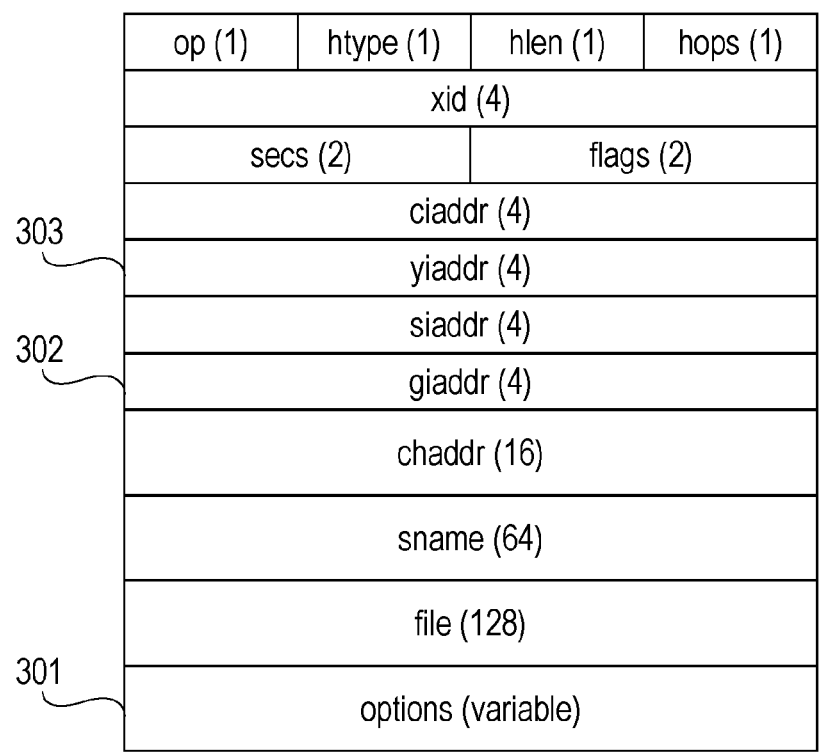
FIG. 3 is a format diagram of a DHCP message.

FIG. 3 is a diagram showing a format of a DHCP message. An "options" field 301 is a field in which various variable length data can be set. In this field, a plurality of pieces of option data, each piece of option data having a 1-byte tag, a 1-byte data size, and variable length data, can be set. The value of the tag may be a pre-standardized value or a vendor-extendable value. The value of the tag such as, for example, a subnet mask or an IP address of a domain name system (DNS) server is widely used as a standardized value.

In the present exemplary embodiment, an extension of the "options" field 301 is used. A tag indicating the IP address of a DP is defined and the IP address of the DP is set as data so that IP address information regarding the DP can be distributed to a DHCP client such as a client PC or a device using the DHCP protocol. Further, in a case where a plurality of DPs exist in a network, the IP addresses of the plurality of DPs are set in the "options" field 301 so that IP address information regarding the DPs can be distributed.

In a "giaddr" field 302, the IP address of a relay agent is set when the relay agent transfers a DHCP message to the DHCP server. Thus, when the DHCP server receives a DHCP message, if the DHCP message is sent from the relay agent, the DHCP server can specify a subnet to which the DHCP client belongs by referring to the "giaddr" field. In a "yiaddr" field 303, an IP address to be assigned to the DHCP client by the DHCP server is set.

Next, the hardware and software configuration of the DHCP server 101, the DP 102, the client PC 103, and the image forming apparatuses 104 and 105 according to the present invention in the system configuration shown in FIG. 1 will be described. In the following description, the image forming apparatus 104 stands for an image forming apparatus, unless otherwise stated.

Figure 4:
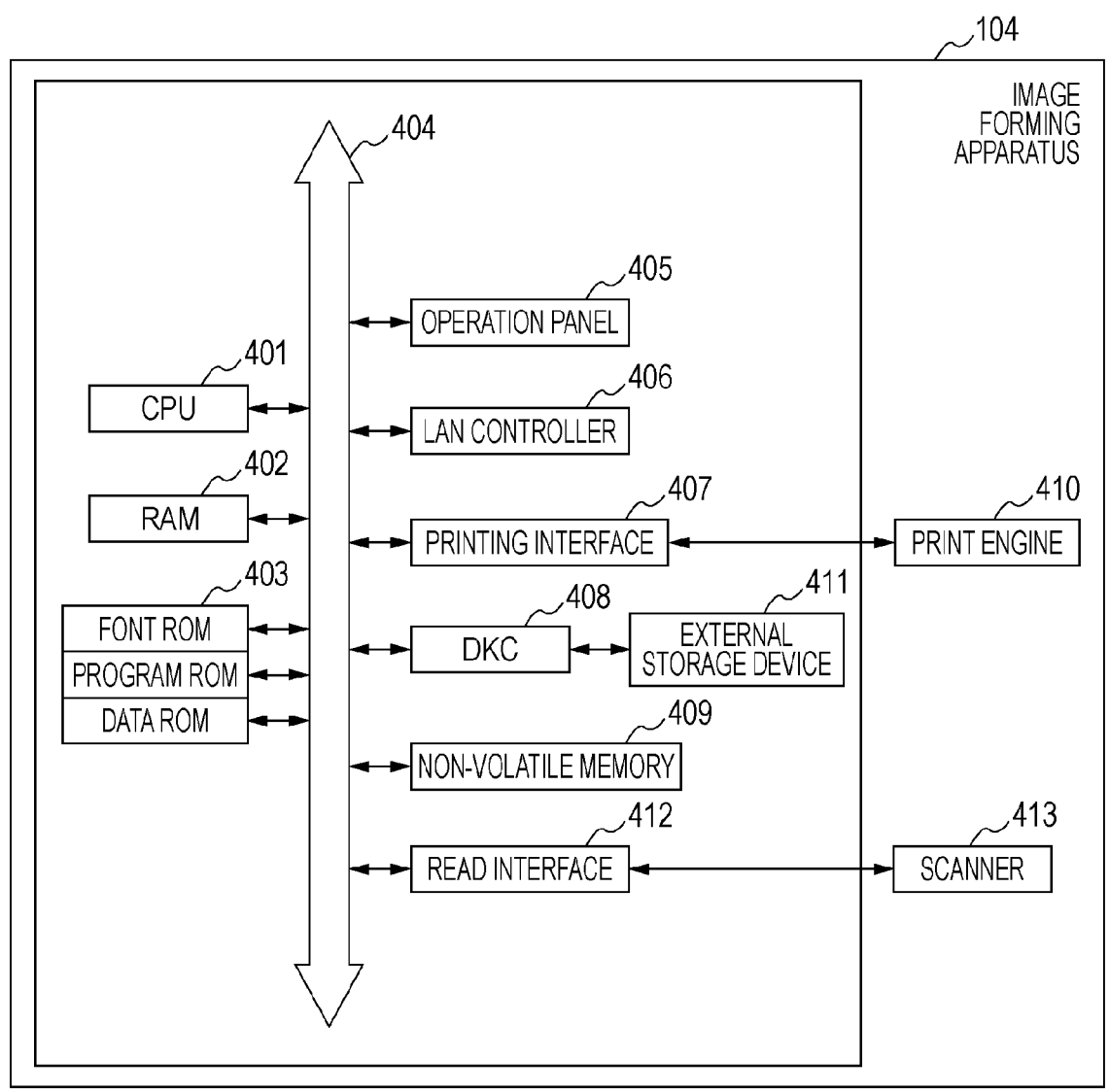
FIG. 4 is a hardware configuration diagram of an image forming apparatus according to the present exemplary embodiment.

FIG. 4 is a block diagram showing a hardware configuration of the image forming apparatus 104. Here, the image forming apparatus 104 will be described as a multi function peripheral (MFP) by way of example. In the MFP 104 shown in FIG. 4, a central processing unit (CPU) 401 controls overall access to various devices connected to a system bus 404 according to a control program stored in a program read-only memory (ROM) of a ROM 403. The CPU 401 further controls output of an image signal serving as output information to a printing unit (print engine) 410 connected via a printer interface 407 or an image signal input from a reading unit (scanner) 413 connected via a reader interface 412. The program ROM of the ROM 403 stores a control program executable by the CPU 401 and the like. A font ROM of the ROM 403 stores font data (including outline font data) and the like used for generating the output information. A data ROM of the ROM 403 stores information and the like to be used on a host computer. The CPU 401 can perform communication processes with a host computer or an image forming apparatus on a network via a LAN controller 406. A random access memory (RAM) 402 mainly functions as a main memory, a work area, or the like of the CPU 401, and is configured to extend the memory capacity using an optional RAM connected to an expansion port (not shown). The RAM 402 is used as an output information expansion area, an environment data storage area, or the like. The access to an external storage device 411 such as a hard disk (HD) or an integrated circuit (IC) card is controlled by a disk controller (DKC) 408. The hard disk stores font data, an emulation program, form data, and the like or is used as a job storage area for temporarily spooling a print job so that the spooled job can be controlled from outside. The hard disk may also be used as a BOX data storage area for holding image data read from the scammer 413 or image data of a print job as BOX data so as to be referred to from a network or to provide printing. An operation panel 405 is configured to allow a user to enter various types of information using software keys. The external storage device described above may not necessarily be one external storage device, and at least more than one external storage device nay be provided so that a plurality of external memories storing programs for interpreting optional font cards and printer control languages of different language systems as well as built-in fonts can be connected. A non-volatile memory 409 stores various types of setting information set through the operational panel 405. Although not shown in the figure, various expansion devices such as a finisher providing a stapling or sorting function and a duplex printing device for implementing a duplex printing function can further optionally be attached to the MFP 104, and the operation of such attached devices is controlled by the CPU 401.

Figure 5:
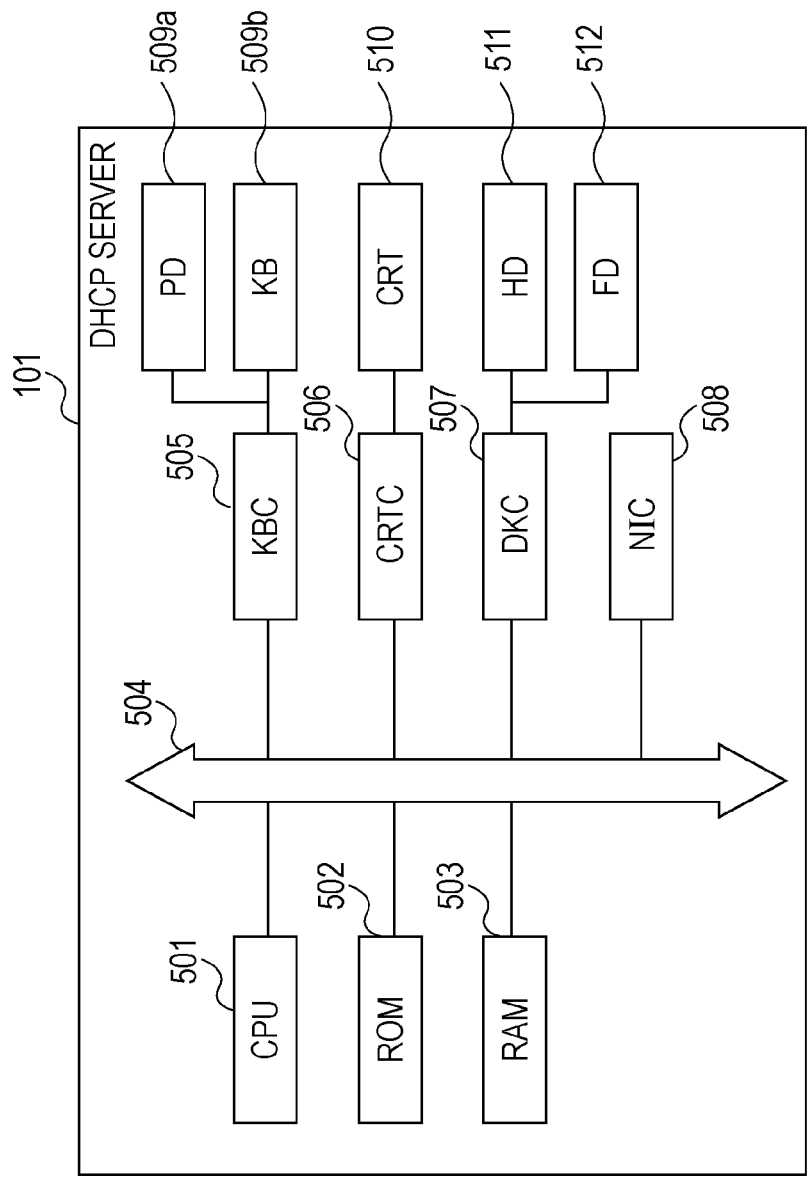
FIG. 5 is a hardware configuration diagram of a DHCP server, a discovery proxy (DP), and a client PC according to the present exemplary embodiment.

FIG. 5 is a block diagram showing a hardware configuration of the DHCP server 101, the DP 102, and the client PC 103. The DHCP server 101, the DP 102, and the client PC 103 may be each implemented by a general-purpose PC, and have a common configuration, which will be described hereinafter.

In FIG. 5, a CPU 501 controls the operation of various devices connected to a system bus 504. A ROM 502 stores a basic input/output system (BIOS) or a boot program, and a RAM 503 is used as a main storage device of the CPU 501. A keyboard controller (KBC) 505 performs processing involving the input of information or the like from a pointing device 509a such as a mouse (registered trademark) or a keyboard 509b. A display control unit (cathode ray tube controller (CRTC)) 506 has an internal video memory. In accordance with an instruction from the CPU 501, image data is rendered in the video memory and the image data rendered in the video memory is output to a CRT 510 as a video signal. In FIG. 5, a CRT is used as a display device by way of illustrative example. Alternatively, any other type of display device such as a liquid crystal display device may be used. A disk controller (DKC) 507 accesses a hard disk 511 or a floppy (registered trademark) disk 512. A network interface card (NIC) 508 is connected to a network to perform information communication via the network. The hard disk 511 stores an operating system (OS), various application programs that operate on the OS, and the like. In the configuration described above, when the power of the apparatus is turned on, the CPU 501 reads the OS from the hard disk 511 into the RAM 503 in accordance with the boot program stored in the ROM 502, and functions as an information processing apparatus.

Figure 6:
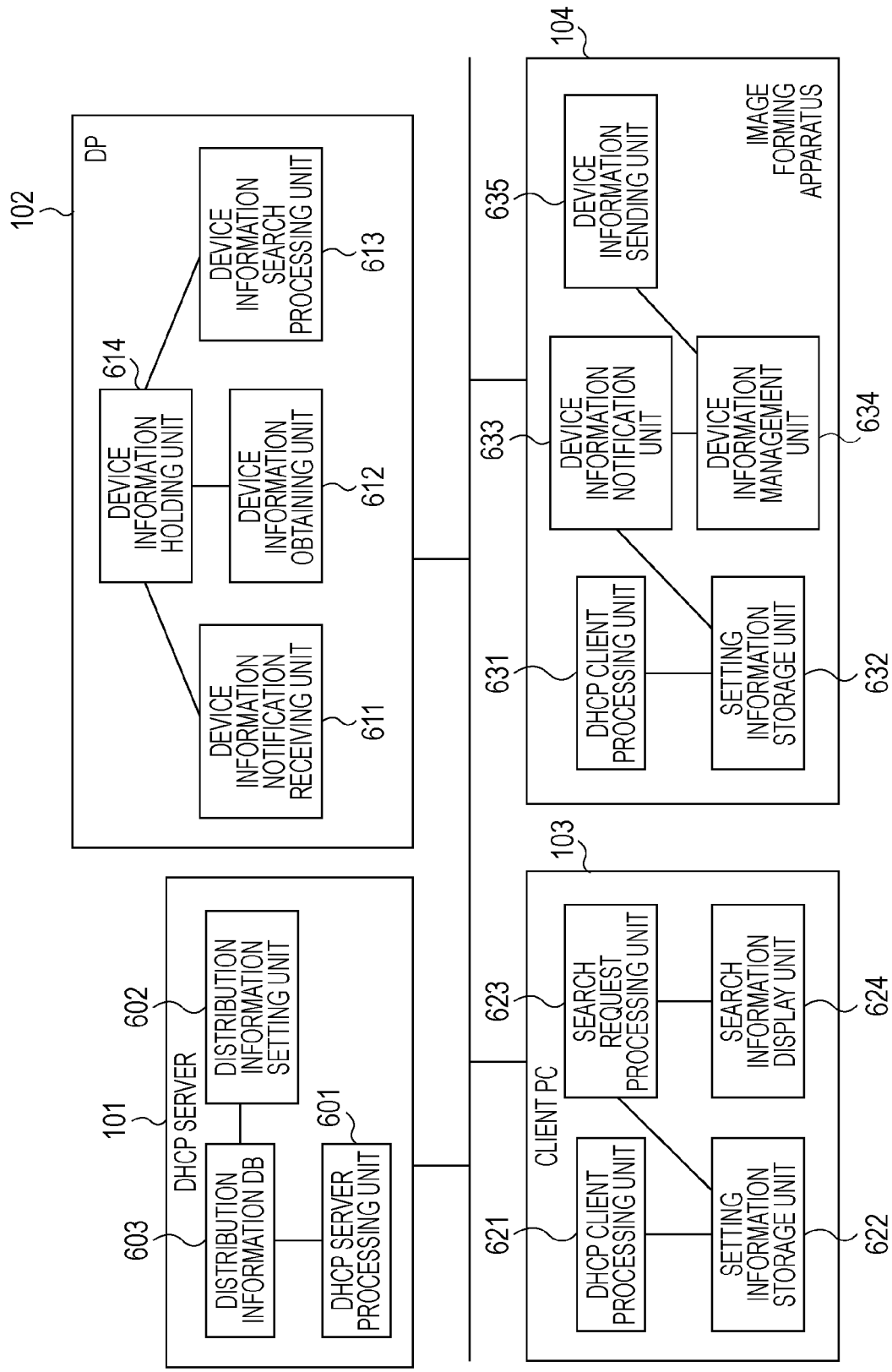
FIG. 6 is a software configuration diagram of the DHCP server, the DP, the client PC, and the image forming apparatus according to the present exemplary embodiment.

FIG. 6 is a block diagram showing a software configuration of the DHCP server 101, the DP 102, the client PC 103, and the image forming apparatus 104. The function units shown in FIG. 6 are executed by the CPU incorporated in each apparatus, and the functions described below are provided in each apparatus.

In the DHCP server 101, a DHCP server processing unit 601 performs the DHCP server processing described above. Specifically, in response to a request from a DHCP client, the DHCP server processing unit 601 performs processes of assigning an IP address to the DHCP client or distributing assigned IP addresses to DHCP clients. A list of IP addresses to be distributed to DHCP clients or setting information is held in a distribution information database (DB) 603. In the present exemplary embodiment, a DHCP client may be the client PC 103 or the image forming apparatus 104. Alternatively, the DP 102 may act as a DHCP client. In response to a request from a DHCP client, the DHCP server processing unit 601 refers to the distribution information DB 603 and distributes various information. A distribution information setting unit 602 is configured to set information to be held in the distribution information DB 603. Information to be distributed may also be set for each subnet to which DHCP clients belong or for each client.

FIG. 7 shows an example of information held in the distribution information DB 603 in the DHCP server 101. A client ID (CID) 701 serves to identify a client to which information is to be distributed. A distribution address 702 represents an IP address to be distributed to a client. A subnet mask 703 represents a subnet mask to be sent to a client. An effective time 704 represents a period during which information distributed to a client is valid. After the effective time has expired, the corresponding information is deleted.

In the DP 102, a device information notification receiving unit 611 receives a notification of a registration request, an update request, or a deletion request of device information from the image forming apparatus 104, and processes device information held in a device information holding unit 614 on the basis of the type of the notification. As a result of the process, if it is determined that it is necessary to obtain device information, a device information obtaining unit 612 sends a device information obtaining request to the image forming apparatus 104, and holds received device information in the device information holding unit 614. A device information search processing unit 613 receives a device information search request from the client PC 103, and searches the device information held in the device information holding unit 614 on the basis of a specified search condition. Then, a search result is sent to the client PC 103. The device information held in the device information holding unit 614 will be described below.

In the client PC 103, a DHCP client processing unit 621 performs the DHCP client processing described above. An IP address and various types of setting information distributed from the DHCP server 101 are held in a setting information storage unit 622, and can be referred to and used as desired. A search request processing unit 623 sends a device search request to the DP 102, and a result is displayed on a search information display unit 624.

In the image forming apparatus 104, a DHCP client processing unit 631 performs the DHCP client processing described above. An IP address and various types of setting information distributed from the DHCP server 101 are held in a setting information storage unit 632, and can be referred to and used as desired. A device information management unit 634 manages device information regarding the image forming apparatus 104. A device information notification unit 633 sends a registration request, an update request, or a deletion request of device information to the DP 102 when a notification of device information is necessary. Upon receipt of a device information obtaining request via a network, a device information sending unit 635 sends the device information managed by the device information management unit 634 to the requester.

FIG. 8 shows an example of the device information held in the device information holding unit 614 of the DP 102.

Information regarding individual devices is held as records, and each record includes an ID 801, a UUID 802, a version 803, a device type 804, a model name 805, a device name 806, a URL 807, and an IP address 808.

The ID 801 represents an identifier (ID) for identifying a device in a DP. The UUID 802 represents a universally unique identifier (UUID) for globally identifying a device. The version 803 represents the version of device information. The device type 804 represents a type such as "MFP" which stands for a multifunction peripheral device or "Printer" which stands for a printer. The model name 805 represents a model name of a device such as "LBPXXXX". The device name 806 represents a name that is assigned to a device by an administrator of the device. The URL 807 represents a uniform resource locator (URL) for obtaining device information. The IP address 808 represents an IP address of a device.

Next, a process of registering the device information regarding the image forming apparatus 104 in the DP 102 will be described. The image forming apparatus 104 acts as a DHCP client, and has received the IP address of the DP 102, as well as the IP address of the image forming apparatus 104, from the DHCP server 101.

When the power of the image forming apparatus 104 is turned on or when the device information is changed, the image forming apparatus 104 sends a Hello message in the form of extensible markup language (XML) as shown in FIG. 9 to the DP 102 via unicast to notify the DP 102 of the existence thereof.

The Hello message shown in FIG. 9 is composed of a header section 901 defined by a <Header> tag and a body section 902 defined by a <Body> tag. The Hello message itself is defined by an <Envelope> tag. This structure is common to all messages used in the present exemplary embodiment.

The header section 901 serves as a common header that does not depend on the contents of the message, and includes an <Action> tag, a <MessageID> tag, and a <To> tag. The <Action> tag is used to identify the type of the message. The <MessageID> tag is an identifier for uniquely identifying the message. The <To> tag is used to identify the destination to which the message is to be sent. The structure of the body section 902 changes depending on the contents of the message. In FIG. 9, the <Body> tag is followed by a <Hello> tag which indicates that this message is a Hello message. The <Hello> tag includes an <EndpointReference> tag, a <Types> tag, an <XAddrs> tag, and a <MetadataVersion> tag. The <EndpointReference> tag includes an <Address> tag having an address information for identifying the device. The <Types> tag has type information regarding the device. The <XAddrs> tag has a URL for obtaining the device information. The <MetadataVersion> tag has the version of the device information.

The DP 102 extracts the value of the <Address> tag in the <EndpointReference> tag from the Hello message as a UUID for globally identifying the device. The DP 102 further extracts the value of the <Types> tag as the device type. The DP 102 further extracts the value of the <MetadataVersion> tag as the version of the device information. The DP 102 further extracts the value of the <XAddrs> tag as the URL for obtaining the device information. The extracted pieces of information are stored in the device information holding unit 614. The IP address of the sender of the Hello message is also stored in the device information holding unit 614.

Thereafter, the DP 102 sends a Get message in the form of XML as shown in FIG. 10 to the URL defined in the <XAddrs> tag via unicast. The Get message shown in FIG. 10 is a message having only a header section. In the header section, an <Action> tag indicates that this message is a Get message.

Upon receipt of the Get message, the device information sending unit 635 of the image forming apparatus 104 sends a GetResponse message as shown in FIG. 11.

In the GetResponse message shown in FIG. 11, a body section is configured to have device information defined in a <Metadata> tag. The <Metadata> tag includes MetadataSection portions 1101, 1102, and 1103 represented by <MetadataSection> tags. Each of the MetadataSection portions is followed by a tag which specifies the type of information contained therein. The MetadataSection portion 1101 includes a <ThisDevice> tag in which information different for each device is stored. A <FriendlyName> tag indicates a name assigned to this device, a <FirmwareVersion> tag indicates the firmware version of this device, and a <Serial Number> tag indicates the serial number of this device. The MetadataSection portion 1102 includes a <This Model> tag in which information different for each model of the device is stored. A <Manufacturer> tag indicates the manufacturer of the device, a <ManufacturerUrl> tag indicates the URL of the manufacturer of the device, a <PresentationUrl> indicates the URL that provides information regarding the device, and a <ModelName> tag indicates the model name of the device. The MetadataSection portion 1103 includes a <Relationship> tag in which information regarding an internal service of the device is stored. In the present exemplary embodiment, the term "internal service" means a print service provided by an image forming apparatus. The <Relationship> tag is followed by a <Hosted> tag including an <EndpointReference> tag, a <Types> tag, and a <ServiceId> tag. The <EndpointReference> tag includes an <Address> tag having address information for using the service. The <Types> tag has type information of the service. The <ServiceId> tag has an identifier for identifying the service in the device.

The DP 102 extracts the value of the <FriendlyName> tag as the device name and the value of the <ModelName> tag as the model name from the received device information, and stores the extracted values in the device information holding unit 614.

Figure 12:
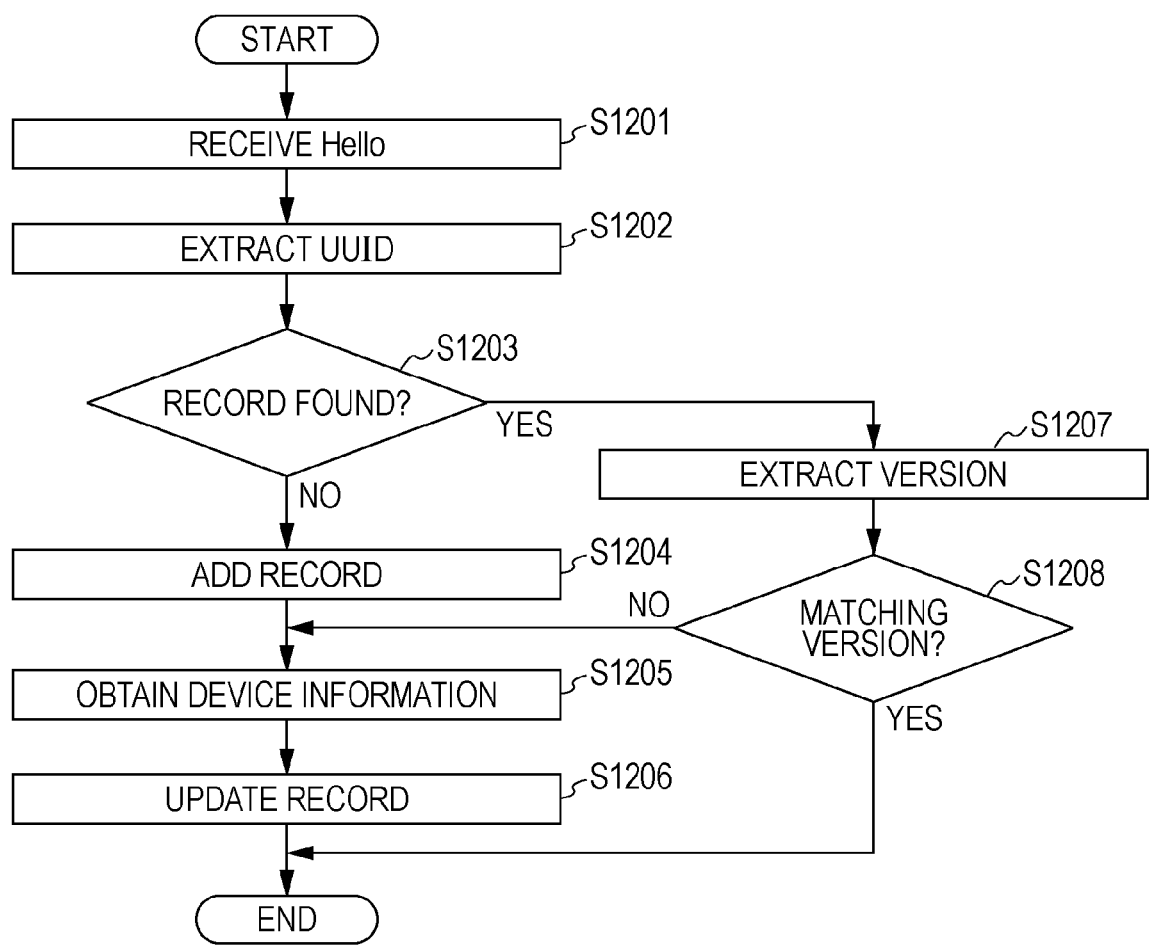
FIG. 12 is a flowchart showing an operation of the DP according to the present exemplary embodiment.

FIG. 12 is a flowchart showing a process regarding a flow of registering the device information described above, which is performed when the DP 102 registers device information in the device information holding unit 614. The steps shown in FIG. 12 are executed by processing a program stored in the ROM 502 by the CPU 501 of the DP 102.

In step S1201, the DP 102 receives a Hello message sent from an image forming apparatus via the NIC 508. Then, in step S1202, the CPU 501 extracts a UUID in the received Hello message. Then, in step S1203, the CPU 501 determines whether or not a record having the same UUID as the extracted UUID is found in the device information holding unit 614. If the record is not found (NO in step S1203), the process proceeds to step S1204, and a new record is added to the device information shown in FIG. 8 held in the device information holding unit 614. Subsequently, in step S1205, the DP 102 sends a Get message to the image forming apparatus to obtain device information. In step S1206, the CPU 501 updates the record added in the device information holding unit 614. If it is determined in step S1203 that the record is found (YES in step S1203), the process proceeds to step S1207, and the CPU 501 extracts version information from the received Hello message. Then, in step S1208, the CPU 501 determines whether or not the version information in the record having the matching UUID matches the version information extracted in step S1207. If the versions are different (NO in step S1208), the process proceeds to step S1205, and the device information is updated. If the versions match (YES in step S1208), the process ends.

Next, a process for deleting the device information registered in the DP 102 by using the image forming apparatus 104 will be described.

When the image forming apparatus 104 stops its operation, for example, when the image forming apparatus 104 is shut down, the image forming apparatus 104 sends a Bye message as shown in FIG. 13 to the DP 102 via unicast.

In the Bye message shown in FIG. 13, a body section includes a <Bye> tag indicating that this message is a Bye message. The <Bye> tag includes an <EndpointReference> tag. The <EndpointReference> tag includes an <Address> tag having address information for identifying the device.

The DP 102 extracts UUID information from the Bye message, and deletes the corresponding device information from the device information holding unit 614.

Next, a process in which the client PC 103 searches for an image forming apparatus using the DP 102 will be described. The client PC 103 acts as a DHCP client and has received the IP address of the DP 102, as well as the IP address of the client PC 103, from the DHCP server 101.

The client PC 103 sends a Probe message in the form of XML as shown in FIG. 14 to the DP 102 via unicast. In the Probe message shown in FIG. 14, a body section includes a <Probe> tag indicating that this message is a Probe message. The <Probe> tag includes a <Types> tag. The <Types> tag specifies the type of the device to be searched for. In the example shown in FIG. 14, a Probe message indicating that a device whose type is printer is to be searched for is shown.

Figure 15:
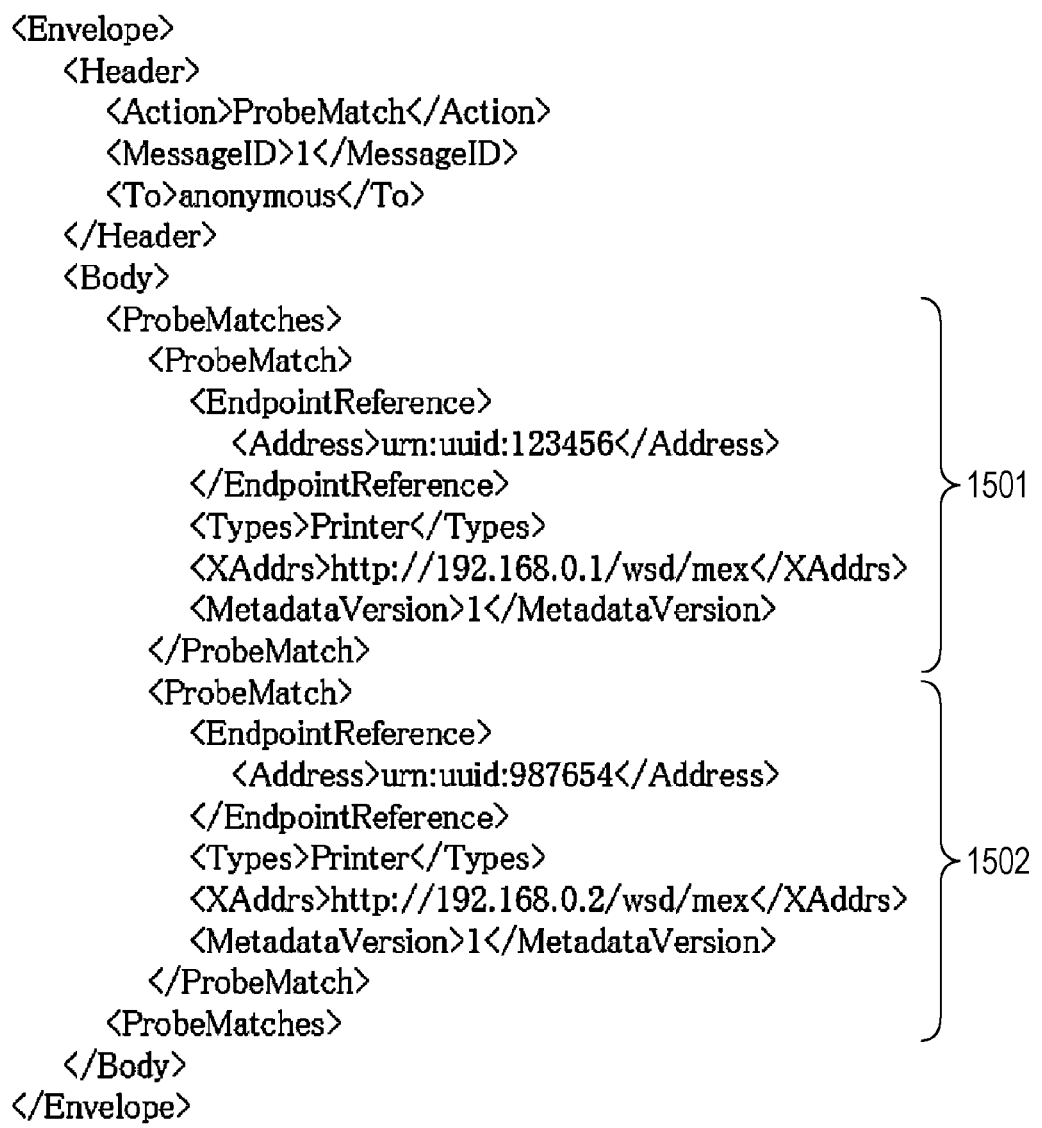
FIG. 15 is a diagram showing an example of a ProbeMatch message according to the present exemplary embodiment.

Upon receipt of the Probe message, the DP 102 extracts the <Types> tag, searches for a device matching the search condition from the device information holding unit 614, and sends a ProbeMatch message as shown in FIG. 15 to the client PC 103. In the ProbeMatch message shown in FIG. 15, a body section includes a <ProbeMatches> tag indicating that this message is a ProbeMatch message. The <ProbeMatches> tag includes ProbeMatch portions 1501 and 1502 each of which is defined by a <ProbeMatch> tag. Each ProbeMatch portion corresponds to one search result. In the example shown in FIG. 15, search results indicating that two devices match the condition are shown. Each ProbeMatch portion has the same structure as the <Hello> tag in the Hello message shown in FIG. 9.

The client PC 103 extracts the URL defined in the <XAddrs> tag from the ProbeMatch message, and sends a Get message as shown in FIG. 10 via unicast. In the present exemplary embodiment, the URL is composed of the IP address of the image forming apparatus 104, and the Get message is sent directly to the image forming apparatus 104 rather than to the DP 102. The image forming apparatus 104 sends a GetResponse message as shown in FIG. 11, and, upon receipt of the GetResponse message, the client PC 103 extracts necessary information.

When the ProbeMatch message includes a plurality of search results, the client PC 103 repeatedly sends the Get message and obtains all pieces of device information.

Figure 16:
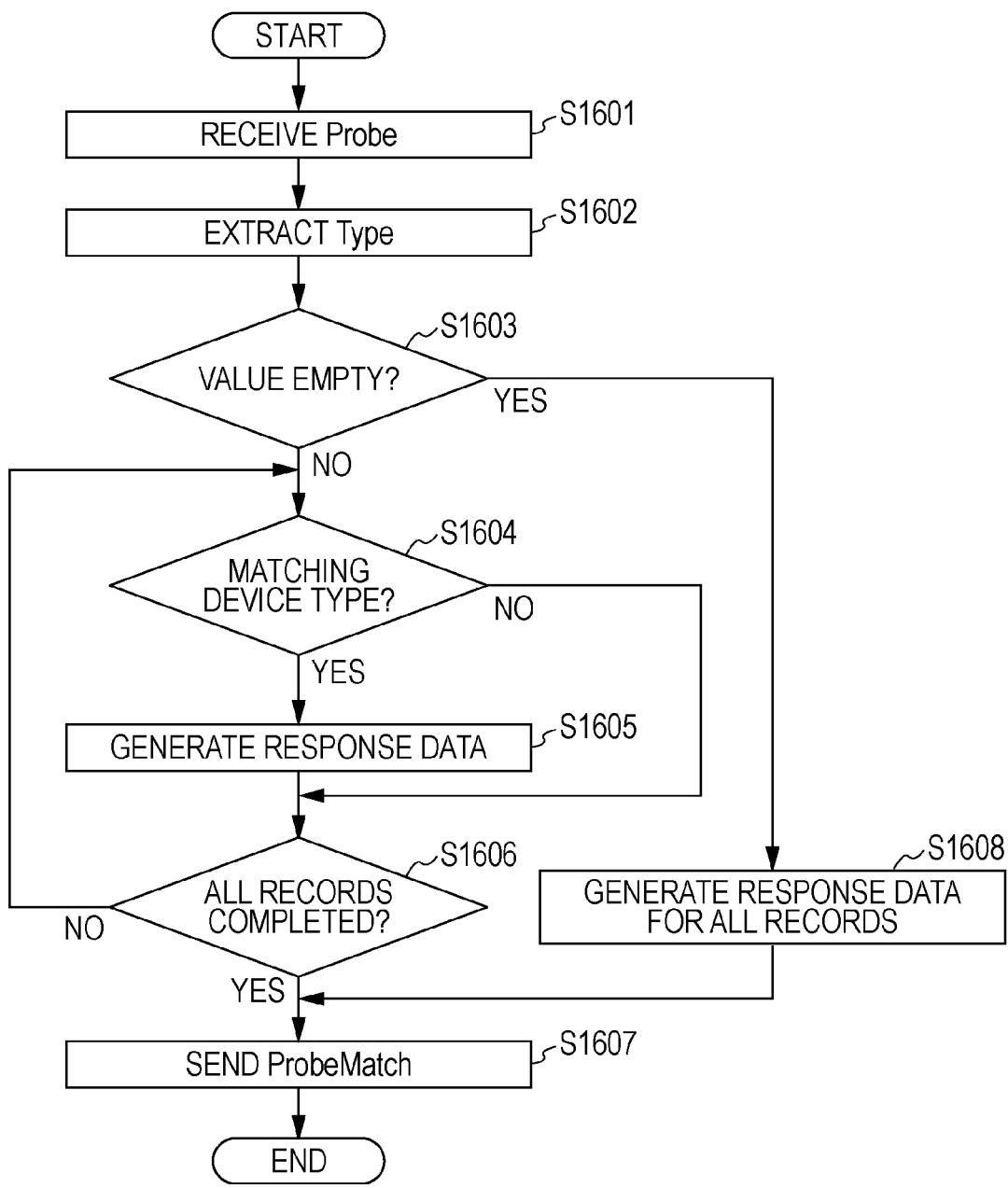
FIG. 16 is a flowchart showing an operation of the DP according to the present exemplary embodiment.

FIG. 16 is a flowchart showing a process regarding a flow of the search described above, which is performed when the DP 102 searches for device information. The steps shown in FIG. 16 are executed by processing a program stored in the ROM 502 by the CPU 501 of the DP 102.

First, in step S1601, the DP 102 receives a Probe message sent from the client PC 103 via the NIC 508. Then, in step S1602, the CPU 501 extracts the value of a <Types> tag in the received Probe message. In step S1603, the CPU 501 determines whether or not the value of the <Types> tag is empty. If the value is not empty (NO in step S1603), then, in step S1604, the CPU 501 searches records of the device information held in the device information holding unit 614 to determine whether or not a record having the same device type as the extracted value is found. If the record having the same device type is found (YES in step S1604), then, in step S1605, the CPU 501 creates response data corresponding to this record. If the record having the same device is not found (NO in step S1604), the process proceeds to step S1606. In step S1606, the CPU 501 determines whether or not confirmation for all the records has been completed. If the search through all the records has not been completed (NO in step S1606), the process returns to step S1604. If the search through all the records has been completed (YES in step S1606), the process proceeds to step S1607, and the CPU 501 collects the previously created response data items into a single unit, and sends a ProbeMatch message as shown in FIG. 15 to the client PC 103. Then, the process ends. Further, if it is determined in step S1603 that the value of the <Types> tag is empty (YES in step 1603), the process proceeds to step S1608, in which response data for all the records is created. Then, in step S1607, a ProbeMatch message is sent to the client PC 103. Then, the process ends. While in the example shown in FIG. 16, the search condition included in the Probe message has been described as a device type by way of example, any other information such as a device name or a model name may be used.

Figures 17, 18:
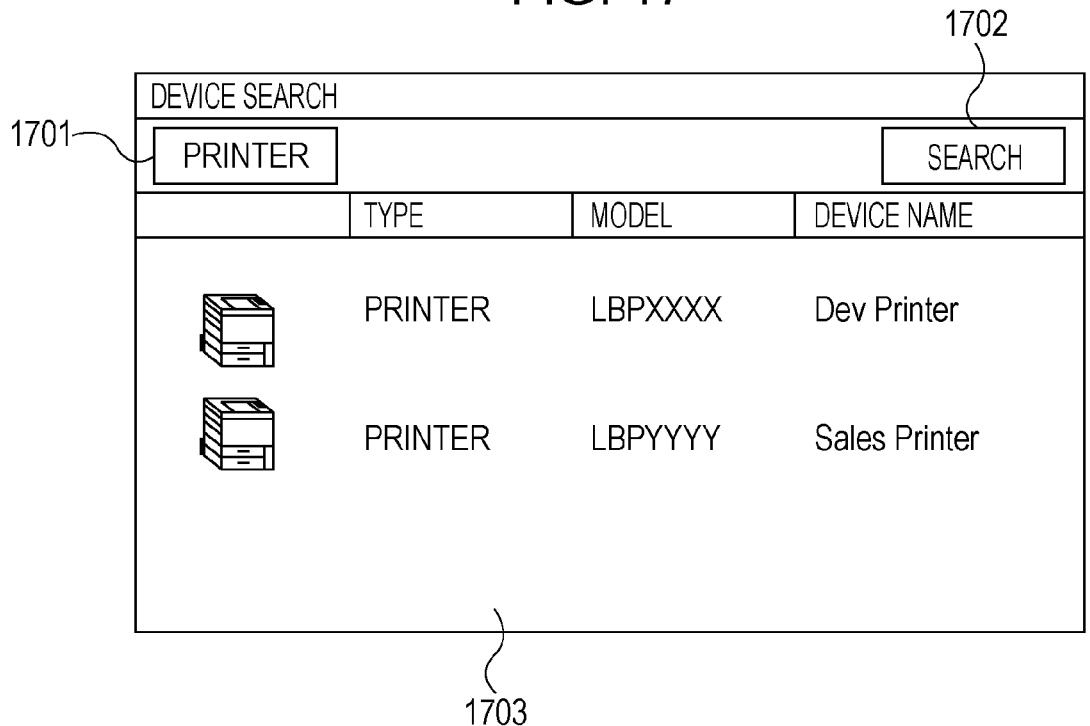
FIG. 17 is a diagram showing an example of a user interface (UI) for searching for an image forming apparatus by using a client PC according to the present exemplary embodiment.
FIG. 18 is a diagram showing an example of a Bye message according to the present exemplary embodiment.

FIG. 17 is a diagram showing an example of a user interface (UI) for searching for an image forming apparatus by using the client PC 103. A screen shown in FIG. 17 is a screen displayed on the CRT 510 of the client PC 103. In FIG. 17, a field 1701 is a field for specifying the type of the device to be searched for, and a keyword such as "MFP" or "Printer" can be entered. If no keyword is entered in the field 1701, all image forming apparatuses are searched for. When a button 1702 is pressed, a search is executed on the DP 102 in the manner described above. Search results are displayed in a field 1703, and types and model names of devices and device names are displayed at the same time based on the obtained information.

FIG. 18 shows a Bye message in which a <DhcpRelease> tag 1801 indicating a request for releasing the IP address delivered from the DHCP server 101 is included when the image forming apparatus 104 sends the Bye message to the DP 102. A <ServerID> tag included in the <DhcpRelease> tag 1801 indicates a server ID for identifying the DHCP server 101, and is used for a DHCP RELEASE message. A <ClientID> tag included in the <DhcpRelease> tag 1801 indicates a client ID for identifying a client in DHCP, and is used for the DHCP RELEASE message. Other tags have a meaning identical or similar to those of the Bye message shown in FIG. 13.

When a <DhcpRelease> tag is found in the Bye message, the DP 102 deletes the device information from the device information holding unit 614. The DP 102 also creates a DHCP RELEASE message from the server ID and client ID collected from the <DhcpRelease> tag, and sends the DHCP RELEASE message to the DHCP server 101. Upon receipt of this message, the DHCP server 101 deletes information based on the client ID included in the DHCP RELEASE message from the distribution information DB 603.

Figure 19:
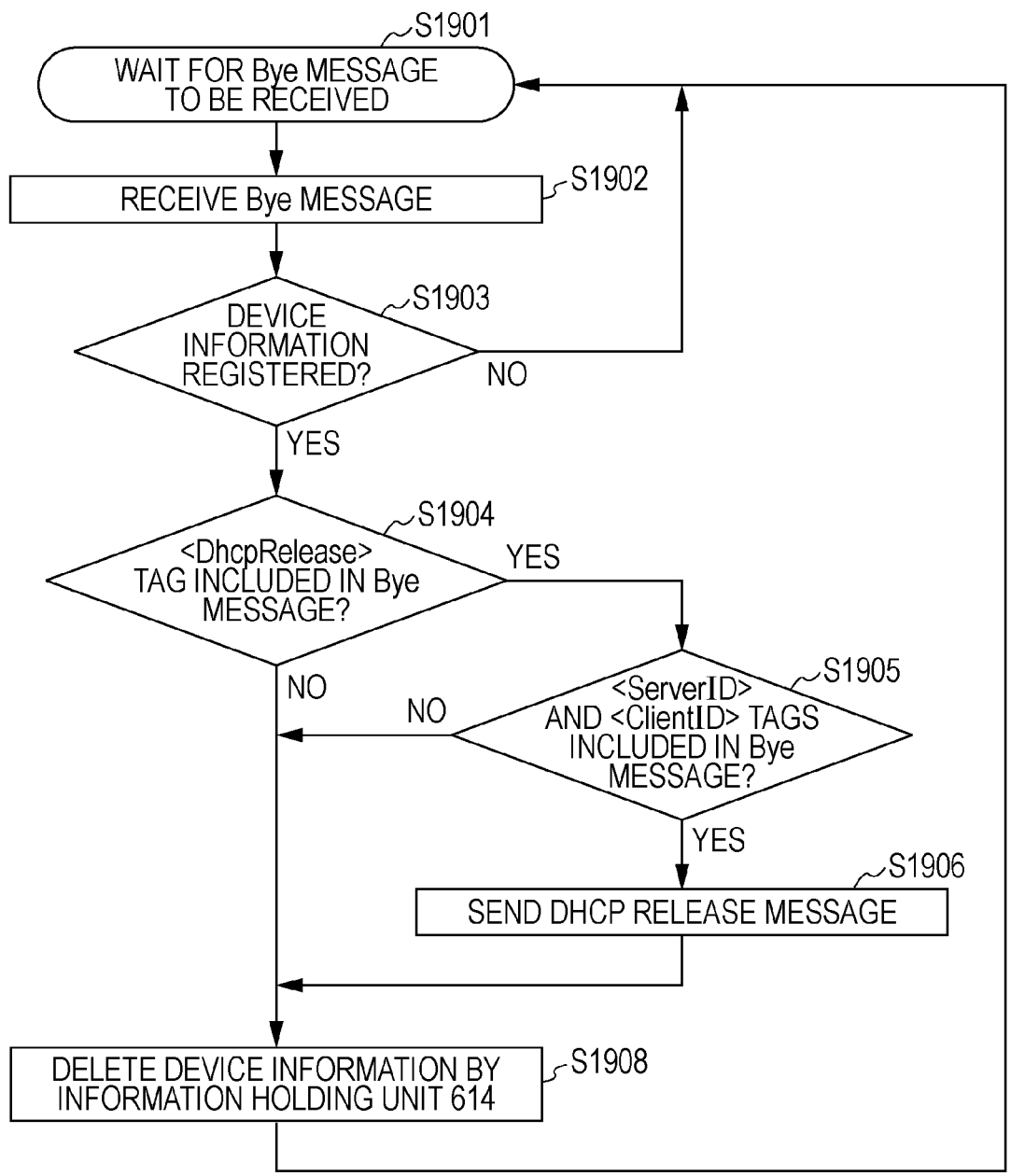
FIG. 19 is a flowchart showing an operation of the DP according to the present exemplary embodiment.

FIG. 19 is a flowchart showing a process performed when the DP 102 receives a Bye message. In particular, the flowchart of FIG. 19 shows a flow processed when the CPU 501 of the DP 102 executes the function of the device information notification receiving unit 611.

In step S1901, the CPU 501 waits for a Bye message to be received. In step S1902, the CPU 501 receives a Bye message sent from the image forming apparatus 104.

In step S1903, the CPU 501 determines whether or not the device information regarding the image forming apparatus 104 that has sent the Bye message is held in the device information holding unit 614. Specifically, the CPU 501 refers to the description of the <Address> tag in the received Bye message and extracts UUID information for identifying the device. Then, the CPU 501 determines whether or not the device information including the extracted UUID information is held in the device information holding unit 614. If it is determined that the device information has been registered (YES in step S1903), the process proceeds to step S1904. If the device information has not been registered (NO in step S1903), the process returns to step S1901.

In step S1904, the CPU 501 determines whether or not the received Bye message includes a <DhcpRelease> tag. In other words, the CPU 501 determines whether the received Bye message is a Bye message of the form shown in FIG. 13 or a Bye message of the form shown in FIG. 18. If it is determined that a <DhcpRelease> tag is included (YES in step S1904), the process proceeds to step S1905. If it is determined that no a <DhcpRelease> tag is included (NO in step S1904), the process proceeds to step S1908.

In step S1905, the CPU 501 determines whether or not the <DhcpRelease> tag includes a <ServerID> tag and a <ClientID> tag. If it is determined that those tags are included (YES in step S1905), the process proceeds to step S1906. If it is determined that those tags are not included (NO in step S1905), the process proceeds to step S1908.

In step S1906, the CPU 501 sends a DHCP RELEASE message to the DHCP server. Specifically, the CPU 501 sends a DHCP RELEASE message to a DHCP server specified by a server ID described in the <ServerID> tag of the received Bye message. The sent DHCP RELEASE message includes a client ID described in the <ClientID> tag of the received Bye message. Thus, the DHCP server that has received this DHCP RELEASE message releases the IP address assigned to the DHCP client corresponding to the client ID (here, the image forming apparatus 104).

In step S1908, the CPU 501 deletes the device information corresponding to the image forming apparatus 104 that has sent the Bye message, which is held in the device information holding unit 614. Specifically, the CPU 501 deletes the device information specified in step S1903. Then, the process returns to step S1901.

According to the present exemplary embodiment, therefore, upon receipt of a Bye message from an image forming apparatus, a DP updates its device information and sends a release notification to a DHCP server. Thus, for example, when the image forming apparatus is shut down, the image forming apparatus is only required to send a Bye message to the DP so that the IP address assigned by the DHCP server can be released. In other words, the IP address assigned by the DHCP server is released even though the image forming apparatus omits the step of sending a DHCP RELEASE message to the DHCP server. Therefore, the management of IP addresses at the DHCP server can be more efficiently performed.

In the first exemplary embodiment described above, upon receipt of a Bye message from an image forming apparatus, a DP sends a DHCP RELEASE message to a DHCP server. In this case, it is required that the image forming apparatus send a Bye message to the DP in order to allow the DP to send a DHCP RELEASE message to the DHCP server. However, in some situations such as when the image forming apparatus is powered off without performing a normal shutdown process, the image forming apparatus may not be allowed to send a Bye message.

Accordingly, only when receiving a Bye message from an image forming apparatus, the DP may, instead of sending a DHCP RELEASE message, detect the non-existence of the image forming apparatus and send a DHCP RELEASE message. Specifically, the DP regularly accesses each of the image forming apparatuses corresponding to the device information held in the device information holding unit 614 to query for its current state. As long as an image forming apparatus exists, a certain response is returned. However, if an image forming apparatus does not exist (such as when the image forming apparatus is not connected to the network or is powered off), no response is returned to the query. Thus, the DP determines that an image forming apparatus from which no response to a query is received does not exist, and deletes the corresponding device information. The DP further sends a DHCP RELEASE message to the DHCP server. Note that there may be a case where no response to a query is returned due to any communication error. Thus, it may be determined that an image forming apparatus does not exist when a predetermined number of queries are sent to the image forming apparatus but no response is returned or when no response is received from the image forming apparatus for a predetermined period of time. In this case, it is necessary to determine whether or not an image forming apparatus from which no response is received to a query is an image forming apparatus assigned an IP address by the DHCP server. Thus, a device information holding unit provided in the DP is configured to hold in advance, for each image forming apparatus, information for identifying whether or not the corresponding image forming apparatus is an image forming apparatus assigned an IP address by the DHCP server. Then, when no response to a query is received from an image forming apparatus, the DP determines whether or not this image forming apparatus has been assigned an IP address by the DHCP server, and determines whether or not to send a DHCP RELEASE message.

Therefore, the DP can send a DHCP RELEASE message to the DHCP server even when an image forming apparatus is shut down (or powered off or disconnected from the network) without sending a Bye message.

In the foregoing alternative exemplary embodiment, an image forming apparatus and an information processing apparatus acting as a DP have been described as separate apparatuses. Those apparatuses may be provided as a single apparatus. Thus, for example, in the example shown in FIG. 1, the image forming apparatus 104 may be provided with the function of the DP 102. Likewise, a client PC may also be provided with the function of a DP in the foregoing exemplary embodiment. Alternatively, an image forming apparatus and a client PC in the foregoing exemplary embodiment may be provided by a single apparatus.

Further, in the present invention, a computer-readable storage medium on which computer program code of software implementing the flowcharts of the exemplary embodiment described above is recorded may be provided to a system or an apparatus. Then, a computer (a CPU or a microprocessing unit (MPU)) of the system or apparatus may read and execute the program code stored in the storage medium to thereby achieve the present invention.

In this case, the program code read from the storage medium implements the functions of one or more of the exemplary embodiments described above, and the storage medium storing the program code constitutes an embodiment of the present invention.

Examples of storage media through which the program code is supplied may include a floppy disk, a hard disk, an optical disk, a magneto-optical disk, a compact disk read-only memory (CD-ROM), a CD-Recordable (CD-R), a digital versatile disk ROM (DVD-ROM), a magnetic tape, a non-volatile memory card, and a ROM.

While the present invention has been described with reference to various exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-145716 filed Jun. 3, 2008, which is hereby incorporated by reference herein in its entirety.

What is claimed is:

1. An information processing apparatus capable of connecting via a network to a plurality of devices and a dynamic-host-configuration-protocol server adapted to perform an assignment of an Internet-protocol address to each of the plurality of devices, comprising:
   a storage unit adapted to store device information for each of the plurality of devices;
   a first receiving unit adapted to receive from a second information processing apparatus a search request for searching for a device;
   a search unit adapted to search for a device in response to the search request received by the first receiving unit;
   a sending unit adapted to send a search result obtained by the search unit to the second information processing apparatus;
   a second receiving unit adapted to receive information indicating that a device stops operation, from the device;
   a determining unit adapted to determine whether the information received by the second receiving unit includes a Bye message indicating that the Internet-protocol address is no longer needed by the device, the Bye message written in a markup language; and
   a control unit adapted to, when the information includes the Bye message, update device information corresponding to the device among the device information stored in the storage unit and to send a DHCP message to end the assignment of the Internet-protocol address assigned to the device to the dynamic-host-configuration-protocol server, and when the information does not include the Bye message, to update device information corresponding to the device among the device information stored in the storage unit and not to send the DHCP message to end the assignment of the Internet-protocol address assigned to the device to the dynamic-host-configuration-protocol server.

2. The information processing apparatus according to claim 1, wherein the information received by the second receiving unit is sent from the device when the device is to be shut down.

3. The information processing apparatus according to claim 1, wherein the information received by the second receiving unit includes information indicating that the device is a device assigned an Internet-protocol address by the dynamic-host-configuration-protocol server.

4. The information processing apparatus according to claim 1,
wherein the information received by the second receiving unit includes identification information of the dynamic-host-configuration-protocol server.

5. The information processing apparatus according to claim 1, wherein the Bye message includes a tag written in the markup language and indicating that the Internet-protocol address is no longer needed by the device.

6. The information processing apparatus according to claim 1, wherein when the determining unit determines that the information received by the second receiving unit includes the Bye message, the control unit deletes the device information corresponding to the device among the device information stored in the storage unit.

7. The information processing apparatus according to claim 1, wherein when the Bye message requests that the assignment of the Internet-protocol address assigned to the device be released, the control unit sends a DHCP RELEASE message as the DHCP message.

8. The information processing apparatus according to claim 1, wherein control unit is adapted to, when the information received by the second receiving unit does not include the Bye message, update the device information corresponding to the device among the device information stored in the storage unit and not to send any message based on the information to the dynamic-host-configuration-protocol server.

9. The information processing apparatus according to claim 1, wherein control unit is adapted to, when the information received by the second receiving unit does not include the Bye message, update the device information corresponding to the device among the device information stored in the storage unit and not to send any message regarding the device to the dynamic-host-configuration-protocol server.

10. The information processing apparatus according to claim 1, wherein the information processing apparatus performs a monitoring of current state of each of the devices corresponding to the device information stored in the storage unit, and when the monitoring indicates that a device is non-responsive, the information processing apparatus updates device information corresponding to the device among the device information stored in the storage unit and sends a DHCP message to end the assignment of the Internet-protocol address assigned to the device to the dynamic-host-configuration-protocol server.

11. The information processing apparatus according to claim 1, wherein the information processing apparatus regularly accesses each of the devices corresponding to the device information stored in the storage unit to query for its current state, and when no response is returned to a predetermined number of the queries of a device, the information processing apparatus determines whether the device is assigned an Internet-protocol address by the dynamic-host-configuration-protocol server, and if the device is assigned an Internet-protocol address by the dynamic-host-configuration-protocol server, the information processing apparatus updates device information corresponding to the device among the device information stored in the storage unit and sends a DHCP message to end the assignment of the Internet-protocol address assigned to the device to the dynamic-host-configuration-protocol server.

12. The information processing apparatus according to claim 1, wherein the information processing apparatus performs a monitoring of current state of each of the devices corresponding to the device information stored in the storage unit, and when the monitoring indicates that a device is non-responsive, the information processing apparatus deletes the corresponding device information of the device from the storage unit and sends a DHCP message to end the assignment of the Internet-protocol address assigned to the device to the dynamic-host-configuration-protocol server.

13. The information processing apparatus according to claim 1, wherein the information processing apparatus regularly accesses each of the devices corresponding to the device information stored in the storage unit to query for its current state, and when no response is returned to a predetermined number of the queries of a device, the information processing apparatus determines whether the device is assigned an Internet-protocol address by the dynamic-host-configuration-protocol server, and if the device is assigned an Internet-protocol address by the dynamic-host-configuration-protocol server, the information processing apparatus deletes the corresponding device information of the device from the storage unit and sends a DHCP message to end the assignment of the Internet-protocol address assigned to the device to the dynamic-host-configuration-protocol server.

14. A method for controlling an information processing apparatus capable of connecting via a network to a plurality of devices and a dynamic-host-configuration-protocol server adapted to perform an assignment of an Internet-protocol address to each of the plurality of devices, comprising:
storing device information for each of the plurality of devices in a storage unit;
receiving from a second information processing apparatus a search request for searching for a device;
searching for a device in response to the received search request;
sending an obtained search result to the second information processing apparatus;
receiving information indicating that a device stops operation, from the device;
determining whether the information received includes a Bye message indicating that the Internet-protocol address is no longer needed by the device, the Bye message written in a markup language; and
when the information includes the Bye message, updating device information corresponding to the device among the device information stored in the storage unit and sending a DHCP message to end the assignment of the Internet-protocol address assigned to the device to the dynamic-host-configuration-protocol server, and when the information does not include the Bye message, updating device information corresponding to the device among the device information stored in the storage unit and not sending the DHCP message to end the assignment of the Internet-protocol address assigned to the device to the dynamic-host-configuration-protocol server.

15. A non-transitory computer-readable storage medium storing a computer program for causing an information processing apparatus capable of connecting via a network to a plurality of devices and a dynamic-host-configuration-protocol server adapted to perform an assignment of an Internet-protocol address to each of the plurality of devices to execute:
storing device information for each of the plurality of devices in a storage unit;
receiving from a second information processing apparatus a search request for searching for a device;

searching for a device in response to the received search request;

sending an obtained search result to the second information processing apparatus;

receiving information indicating that a device stops operation, from the device;

determining whether the information received includes a Bye message indicating that the Internet-protocol address is no longer needed by the device, the Bye message written in a markup language; and when the information includes the Bye message, updating device information corresponding to the device among the device information stored in the storage unit and sending a DHCP message to end the assignment of the Internet-protocol address assigned to the device to the dynamic-host-configuration-protocol server, and when the information does not include the Bye message, updating device information corresponding to the device among the device information stored in the storage unit and not sending the DHCP message to end the assignment of the Internet-protocol address assigned to the device to the dynamic-host-configuration-protocol server.

* * * * *